US011237897B2

(12) United States Patent
Bhatia et al.

(10) Patent No.: US 11,237,897 B2
(45) Date of Patent: Feb. 1, 2022

(54) DETECTING AND RESPONDING TO AN ANOMALY IN AN EVENT LOG

(71) Applicant: International Business Machines Corporation, Armonk, NY (US)

(72) Inventors: Aankur Bhatia, Bethpage, NY (US); Chadwick M. Baatz, Naperville, IL (US); Gary I. Givental, Bloomfield Hills, MI (US); Thomas Wallace, Grosse Pointe Park, MI (US); Srinivas B. Tummalapenta, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 16/522,005

(22) Filed: Jul. 25, 2019

(65) Prior Publication Data

US 2021/0026722 A1 Jan. 28, 2021

(51) Int. Cl.
*G06F 11/00* (2006.01)
*G06F 11/07* (2006.01)
*G06N 20/00* (2019.01)
*G06K 9/62* (2006.01)

(52) U.S. Cl.
CPC ........ *G06F 11/079* (2013.01); *G06F 11/0766* (2013.01); *G06F 11/0793* (2013.01); *G06K 9/6256* (2013.01); *G06N 20/00* (2019.01)

(58) Field of Classification Search
CPC .............. G06F 11/0781; G06F 11/079; G06F 11/0766; G06F 11/0793; G06N 20/00; G06K 9/6256
See application file for complete search history.

(56) References Cited

U.S. PATENT DOCUMENTS

| 9,112,895 | B1 | 8/2015 | Lin |
| 9,323,837 | B2 | 4/2016 | Zhao et al. |
| 9,349,103 | B2 | 5/2016 | Eberhardt, III et al. |

(Continued)

FOREIGN PATENT DOCUMENTS

| WO | 2018177247 A1 | 10/2018 |
| WO | WO2018177247 A1 | 10/2018 |

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Jonathan D Gibson
(74) *Attorney, Agent, or Firm* — Stephen J. Walder, Jr.; Jeffrey S. LaBaw

(57) ABSTRACT

A method identifies and prioritizes anomalies in received monitoring logs from an endpoint log source. One or more processors identify anomalies in the monitoring logs by applying a plurality of disparate types of anomaly detection algorithms to the monitoring logs, and then determine a likelihood that the identified anomalies are anomalous based on outputs of the plurality of disparate types of anomaly detection algorithms. The processor(s) then prioritize the monitoring logs based on the likelihood that the identified anomalies are actually anomalous, and send prioritized monitoring logs that exceed a priority level to a security information and event management system (SIEM).

20 Claims, 10 Drawing Sheets

(56) References Cited

U.S. PATENT DOCUMENTS

| | | | |
|---|---|---|---|
| 9,652,354 | B2 | 5/2017 | Filimonov et al. |
| 10,392,022 | B1* | 8/2019 | Rau .................. H04W 4/44 |
| 10,795,753 | B2* | 10/2020 | Xu ................ G06F 11/0781 |
| 10,884,842 | B1* | 1/2021 | Ramachandran Vijayalekshmi .... G06F 11/0769 |
| 2011/0296244 | A1 | 12/2011 | Fu et al. |
| 2015/0047040 | A1 | 2/2015 | Cobb et al. |
| 2016/0196174 | A1* | 7/2016 | Jacob ............. G06F 11/0781 714/37 |
| 2016/0224898 | A1* | 8/2016 | Ryckbosch ...... G06F 11/3409 |
| 2018/0004948 | A1 | 1/2018 | Martin et al. |
| 2018/0096261 | A1 | 4/2018 | Chu et al. |
| 2018/0113773 | A1* | 4/2018 | Krishnan ........... G06F 11/008 |
| 2018/0349605 | A1 | 12/2018 | Wiebe et al. |
| 2018/0367561 | A1 | 12/2018 | Givental et al. |
| 2019/0087737 | A1* | 3/2019 | Pendar ................ G06F 17/18 |
| 2019/0243743 | A1 | 8/2019 | Saxena et al. |
| 2019/0278684 | A1* | 9/2019 | Dede .................. H04W 4/38 |
| 2019/0324831 | A1* | 10/2019 | Gu .................. G06F 11/0778 |
| 2019/0370610 | A1* | 12/2019 | Batoukov ......... G06F 11/0793 |
| 2020/0073738 | A1* | 3/2020 | Gaida ............... H04L 41/5074 |
| 2020/0349169 | A1* | 11/2020 | Venkatesan ........... G06N 20/00 |
| 2021/0026722 | A1* | 1/2021 | Bhatia ................ G06N 3/088 |
| 2021/0166140 | A1* | 6/2021 | Cheng ................ G06N 20/00 |

OTHER PUBLICATIONS

List of IBM Patents or Patent Applications Treated as Related, Apr. 16, 2020, 2 pages.

Mell, Peter et al., "The NIST Definition of Cloud Computing", The National Institute of Standards and Technology, U.S. Department of Commerce, Special Publication 800-145, Sep. 2011, 7 pages.

Yang, Xinzhu et al., "Dynamic Weighting Ensembles for Incremental Learning", Chinese Conference on Pattern Recognition, Nov. 4-6, 2009, 5 pages.

* cited by examiner

|  | Log 0 | Log 1 | Log 2 | Log 3 | Log 4 |
|---|---|---|---|---|---|
| time | 1331875800 | 1331875800 | 1331875800 | 1331875800 | 1331875800 |
| src_ip_address | 192.168.202.79 | 192.168.202.79 | 192.168.202.79 | 192.168.202.79 | 192.168.202.79 |
| total bytes | 46131 | 46135 | 46137 | 50485 | 46185 |
| dst_ip_address | 192.168.229.254 | 192.168.229.254 | 192.168.229.254 | 192.168.229.251 | 192.168.229.254 |
| port | 443 | 443 | 443 | 80 | 443 |
| port type | tcp | tcp | tcp | tcp | tcp |
| protocol | ssl | ssl | ssl | http | ssl |
| conn duration | 0.010000 | 0.010000 | 0.020000 | 0.010000 | 0.010000 |
| bytes sent | 548 | 544 | 544 | 165 | 548 |
| bytes recd | 1060 | 1060 | 1060 | 214 | 1060 |
| conn state | SF | SF | SF | SF | SF |
| history | ShaDadfFr | ShaDadfFr | ShaDadfFr | ShaDadfFr | ShaDadfFr |
| orig pkts | 8 | 8 | 8 | 4 | 8 |
| orig IP bytes | 972 | 968 | 968 | 381 | 972 |
| resp pkts | 13 | 13 | 13 | 3 | 13 |
| resp IP bytes | 1744 | 1744 | 1744 | 382 | 1744 |

| | | | | | | | |
|---|---|---|---|---|---|---|---|
| Total_bytes | 0.22423 | 0.224491 | 0.224621 | 0.508457 | 0.228407 | 0.228669 | 0.229321 |
| Port | -0.96799 | -0.96799 | -0.96799 | -0.98559 | -0.96799 | -0.96799 | -0.96799 |
| bytes_sent | -0.00659 | -0.00659 | -0.00659 | -0.000662 | -0.000659 | -0.000659 | -0.000659 |
| bytes_recd | -0.00051 | -0.00051 | -0.00051 | -0.000123 | -0.000051 | -0.000051 | -0.000051 |
| orig_pkts | 0.024239 | 0.024239 | 0.024239 | 0.008034 | 0.024239 | 0.024239 | 0.024239 |
| orig_IP_bytes | 0.007263 | 0.007222 | 0.007222 | 0.001085 | 0.007263 | 0.007263 | 0.007263 |
| resp_pkts | 0.047862 | 0.047862 | 0.047862 | 0.006411 | 0.047862 | 0.047862 | 0.047862 |
| resp_IP_bytes | 0.009243 | 0.009243 | 0.009243 | -0.0008 | 0.009243 | 0.009243 | 0.009243 |
| SrcNumIP | -0.04971 | -0.04971 | -0.04971 | -0.04971 | -0.04971 | -0.04971 | -0.04971 |
| DstNumIP | -0.04909 | -0.04909 | -0.04909 | -0.04909 | -0.04909 | -0.04909 | -0.04909 |
| Dev_total_Bytes | -0.98584 | -0.98584 | -0.98584 | -0.55147 | -0.97945 | -0.97906 | -0.97806 |
| port_labels | -0.01366 | -0.01366 | -0.01366 | -0.01366 | -0.01366 | -0.01366 | -0.01366 |
| Protocol_labels | 9.723499 | 9.723499 | 9.723499 | 6.015886 | 9.723499 | 9.723499 | 9.723499 |
| med_conn_dur | -0.01361 | -0.01361 | -0.01309 | -0.01361 | -0.01361 | -0.01361 | -0.01309 |
| bytes_diff | 0.006515 | 0.006515 | 0.006515 | 0.006478 | 0.006515 | 0.006515 | 0.006515 |
| conn_labels | 2.635372 | 2.635372 | 2.635372 | 2.635372 | 2.635372 | 2.635372 | 2.635372 |
| history_labels | -0.48182 | -0.48182 | -0.48182 | 0.161926 | -0.48182 | -0.48182 | -0.48182 |
| pkts_diff | 0.16443 | 0.16443 | 0.16443 | -0.00129 | 0.16443 | 0.16443 | 0.16443 |
| IP_bytes_diff | 0.003699 | 0.003726 | 0.003726 | -0.0014 | 0.003699 | 0.003699 | 0.003699 |
| IP_resp_median | 0.009243 | 0.009243 | 0.009243 | -0.0008 | 0.009243 | 0.009243 | 0.009243 |
| IP_orig_median | 0.007263 | 0.007222 | 0.007222 | 0.001085 | 0.007263 | 0.007263 | 0.007263 |
| SrcIPIntExt_External | -0.0786 | -0.0786 | -0.0786 | -0.0786 | -0.0786 | -0.0786 | -0.0786 |
| SrcIPIntExt_Internal | 0.078599 | 0.078599 | 0.078599 | 0.078599 | 0.078599 | 0.078599 | 0.078599 |
| DstIPIntExt_External | -0.10623 | -0.10623 | -0.10623 | -0.10623 | -0.10623 | -0.10623 | -0.10623 |
| DstIPIntExt_Internal | 0.106229 | 0.106229 | 0.106229 | 0.106229 | 0.106229 | 0.106229 | 0.106229 |

DETECTING AND RESPONDING TO AN ANOMALY IN AN EVENT LOG

BACKGROUND

The present invention relates to the field of event logs. Still more specifically, the present invention relates to the field of prioritizing anomalies in an event log for handling thereof.

SUMMARY

In an embodiment of the present invention, a method identifies and prioritizes anomalies in received monitoring logs from an endpoint log source. One or more processors identify anomalies in the monitoring logs by applying a plurality of disparate types of anomaly detection algorithms to the monitoring logs, and then determine a likelihood that the identified anomalies are anomalous based on outputs of the plurality of disparate types of anomaly detection algorithms. The processor(s) then prioritize the monitoring logs based on the likelihood that the identified anomalies are actually anomalous, and send prioritized monitoring logs that exceed a priority level to a security information and event management system (SIEM).

In an embodiment of the present invention, processor(s) train an artificial intelligence (AI) system to further recognize an anomaly in an event log.

In an embodiment of the present invention, the AI system directs a controller to activate, modify, change a functionality of, and/or otherwise affect a physical device based on the recognized anomaly in the event log.

In one or more embodiments, the method(s) described herein are performed by an execution of a computer program product and/or a computer system.

BRIEF DESCRIPTION OF THE DRAWINGS

FIG. 2 illustrates an exemplary type of event log as used in one or more embodiments of the present invention;

DETAILED DESCRIPTION

Figure 1:
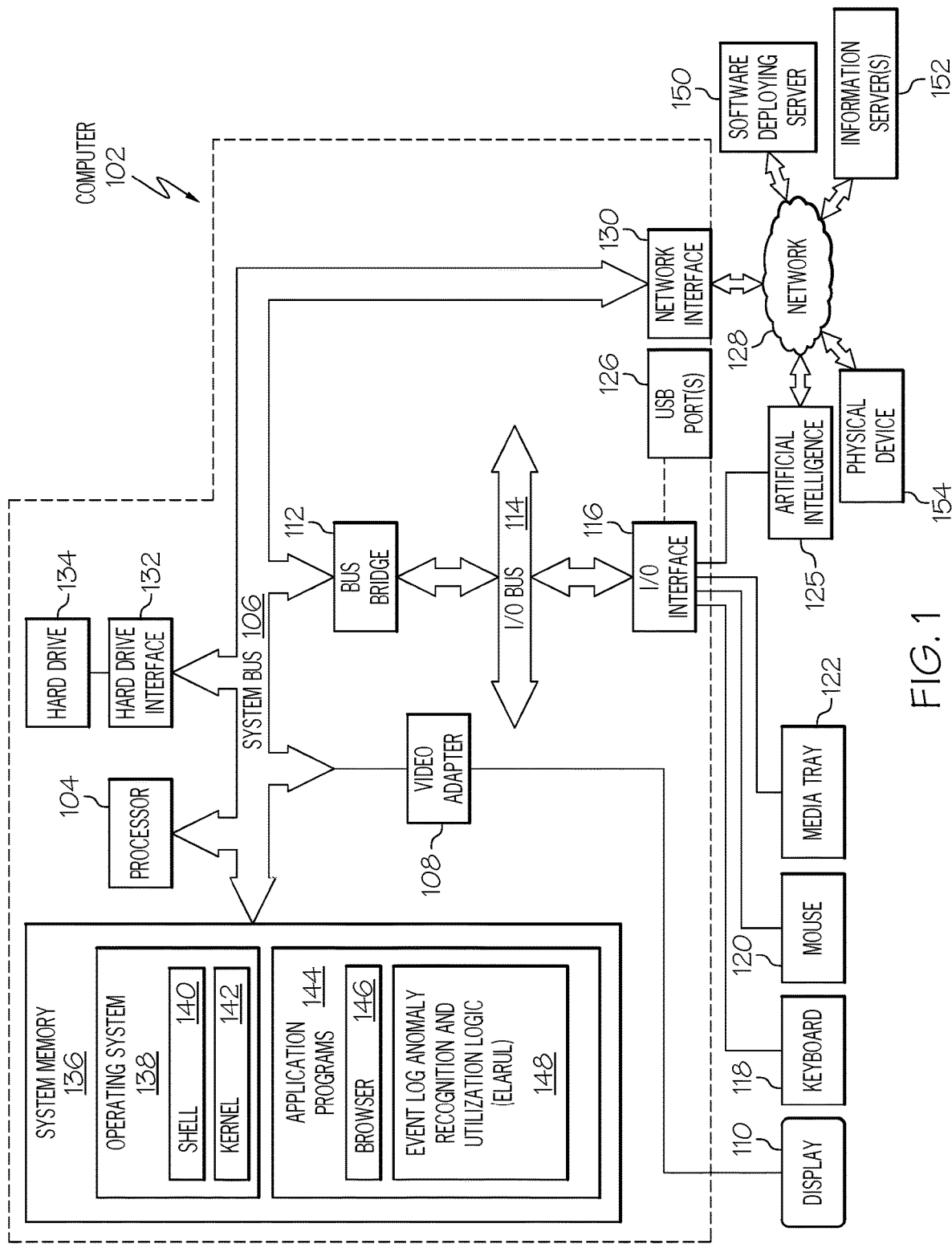
FIG. 1 depicts an exemplary system and network in which the present invention is implemented in various embodiments.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

There are millions of logs ingested today on a daily basis into a SIEM (Security Incident and Event Management) platform that are correlated in real time generating offenses for analyst or machine disposition. Estimates show nearly 95-98% of these logs are benign (normal) while a very small percentage are anomalous (indicating a problem with the system that is being logged). It takes considerable system (SIEM) resources to process such a high volume of logs resulting in system latency, degraded performance and inadequate results. Also, due to inadequate rule tuning and unoptimized system performance, there are a plethora of offenses generated for analysts leading to long lead times resulting in user dissatisfaction. As such, excessive logs result in a higher number of events (logs) per second (EPS) and/or a higher number of offenses produced per month (OPM) going to the SIEM system.

However, if individual logs could be classified as either "anomalous" or "normal" using unsupervised machine learning techniques, then a system could be built to forward only "anomalous" logs to SIEM in real time, thus reducing EPS/OPM numbers, reducing analyst time, and improving system performance. One or more embodiments of the present invention, as described herein, provide a new and nonobvious system that performs this functionality, by filtering logs and/or prioritizing SIEM log ingestion based on relative importance of the log traffic and the likelihood of it being anomalous.

As described herein, one or more embodiments of the present invention provides a unique technique for log filtering and log prioritization. In an embodiment described herein, the present invention uses three anomaly detection algorithms applied to incoming logs from endpoint log sources. In an embodiment of the present invention, these anomaly detection algorithms include a first anomaly detection algorithm built on random data tree formation (e.g., Isolation Forest); a second anomaly detection algorithm built on a low-dimensional representation of input space of training samples (e.g., a self organizing map—SOM); and a third anomaly detection algorithm based on a clustering algorithm (e.g., a density-based spatial clustering of applications with noise—DBSCAN). The algorithms are applied to logs as they are ingested in real time into a data lake that utilizes MapReduce to create a manageable data system, from which an anomaly score is generated by each of the anomaly detection algorithms.

Isolation Forest uses a system in which test log data is randomly split into branches of a tree, such that an anomalous unit of data is isolated into an isolation branch on the tree. That isolation branch is further split into smaller isolation branches, such that fewer non-anomalous units of data are included in each successive isolation branch, while still containing the anomalous unit of data. The test log data is used recursively to be randomly split into different branches, in order to get an average number of isolation branch splits are needed in order to have a branch that only contains the anomalous unit of data for a particular type of log data. Thereafter, when new (unknown) log data is evaluated using Isolation Forest, this new log data is split using the average number of isolation branch splits determined by the test log data, in order to isolate the anomalous log data.

A Self Organizing Map (SOM) algorithm takes a high dimensional set of data (i.e., data that contains information about many parameters) and reduces it to a low dimensional (e.g., two-dimensional) map. A SOM algorithm uses unsupervised learning to create the low dimensional map in a neural network by allowing neurons in a neural network to "compete" with one another for the title of "winner-take-all neuron", such that the winner-take-all neuron handles a particular type of data from the input neuron layer. The winning neuron (winner-take-all neuron) is a neuron that produces a highest output when compared to other neurons that receive the same input data from training data. The winning neuron is then given a higher weight, such that when similar data (i.e., similar to the training data according to parameters, values, etc.) is entered into the neural network, the winning neuron is given an advantage in handling that similar data as the new winner-take-all neuron for that similar (new) data. If the winning neuron is physically distant from the input neuron having a similar weight, then that weight is transferred to a neuron that is physically close to the input neuron having the similar weight, such that the winning neuron "migrates" closer to that input neuron.

Cooperation between neurons in the neural network then causes neurons that are topologically close to the winning neuron to be associated with the winning neuron.

Once the winning neuron is identified for a first input layer, then that particular input and the winning neuron are moved closer to one another on the SOM. Once all of the winning neurons (which can include topologically close neurons) for all of the input data are identified, a cluster of related input data and their winning/close neurons are represented on the final SOM.

A clustering algorithm identifies clusters of data that are determined to be normal due to their density, while other sparse data that is not part of the dense cluster are deemed to be anomalous.

One type of clustering algorithm is density-based spatial clustering of applications with noise—DBSCAN. DBSCAN defines a dense cluster as a cluster of data points that are mutually density-connected, such that if a data point is directly-reachable (i.e., without traversing through another data point to reach one another) from any point of the dense cluster, then it is part of that dense cluster.

Another type of clustering algorithm is k-means clustering, which partitions data into Voronoi cells in which all data points in a Voronoi cell are closer to a pre-specified seed point in a first cell than a pre-specified seed point in another cell. However, since k-means clustering uses supervised learning (that sets the seed points), it is not used in a preferred embodiment of the present invention that uses unsupervised learning. Nonetheless, k-means are used in other embodiments of the present invention.

Another type of clustering algorithm is Gaussian mixture models (GMM), which uses statistical probability to determine which data belongs in a cluster of normal data, such that any data points outside of that cluster is deemed to be anomalous.

Density-based spatial clustering of applications with noise (DBSCAN) identifies data points that are tightly clustered together, and then recognizes data points that are not part of that tightly clustered set of data as being outlier (anomalous) data.

Thus, once the logs that are deemed to be highly likely for being anomalous are identified, in an embodiment of the present invention only those highly likely (high priority) anomalous logs are sent to a security information and event management (SIEM) system, thereby improving the functionality of the SIEM (by reducing its workload to only reviewing high priority logs), and the functionality of the overall system by reducing the amount of traffic being sent from the incoming logs to the SIEM.

With reference now to the figures, and in particular to FIG. 1, there is depicted a block diagram of an exemplary system and network that can be utilized by and/or in the implementation of the present invention. Note that some or all of the exemplary architecture, including both depicted hardware and software, shown for and within computer 102 can be utilized by artificial intelligence 125 and/or software deploying server 150 and/or information server(s) 152 and/or (remote) physical device 154 shown in FIG. 1; and/or security service 601 and/or the cluster ecosystem platform of servers 610, and/or device 632 shown in FIG. 6; and/or one or more of the neurons/nodes shown in Deep Neural Network 725 in FIG. 7.

Exemplary computer 102 includes a processor 104 that is coupled to a system bus 106. Processor 104 can utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which can include storage devices such as CD-ROM drives, multi-media interfaces, etc.), an artificial intelligence 125, and external USB port(s) 126. While the format of the ports connected to I/O interface 116 can be any known to those skilled in the art of computer architecture, in one embodiment some or all of these ports are universal serial bus (USB) ports.

As depicted, computer 102 is able to communicate with a software deploying server 150 and/or the information server(s) 152 and/or the physical device 154 and/or the artificial intelligence 125 using a network interface 130 to a network 128. Network interface 130 is a hardware network interface, such as a network interface card (NIC), etc. Network 128 can be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an Event Log Anomaly Recognition and Utilization Logic (ELARUL) 148. ELARUL 148 includes code for implementing the processes described below, including those described in FIGS. 2-8. In one embodiment, computer 102 is able to download ELARUL 148 from software deploying server 150, including on an on-demand basis, wherein the code in ELARUL 148 is not downloaded until needed for execution. Note further that, in one embodiment of the present invention, software deploying server 150 performs all of the functions associated with the present invention (including execution of ELARUL 148), thus freeing computer 102 from having to use its own internal computing resources to execute ELARUL 148.

Also connected to (or alternatively, as part of) computer 102 is an artificial intelligence 125. In exemplary embodiments of the present invention, artificial intelligence 125 is a deep neural network (see FIG. 7), a convolutional neural network, or another type of heuristic artificial intelligence (also referred to as "machine learning").

Also connected to computer 102 are information server(s) 152, which supply sensor log data from sensors (not shown within physical device 154) within a monitored device such as the physical device 154. One or more examples of physical device 154 are presented below.

Note that the hardware elements depicted in computer 102 are not intended to be exhaustive, but rather are representative to highlight essential components required by the present invention. For instance, computer 102 can include alternate memory storage devices such as magnetic cassettes, digital versatile disks (DVDs), Bernoulli cartridges, and the like. These and other variations are intended to be within the spirit and scope of the present invention.

As described herein, business logic (e.g., isolation forest, self organizing maps—SOM, and density-based spatial clustering of applications with noise—DBSCAN) are applied to logs as they are ingested in order to classify logs with anomaly scores below a configured threshold as "normal" (benign) and to classify those that are above this configured threshold as "anomalous" (potentially harmful). All anomalous logs are routed to a prioritization system for assigning log priority while normal logs are retained in the unstructured database within the big data platform.

The prioritization system assigns a unique priority to each log for security information and event management (SIEM) ingestion. Within SIEM, a connection is established to a cluster ecosystem platform for importing related logs for correlation and generating offenses. Related logs can be determined by a time range, but other methods such as traffic from same attacker can also be used to ensure proper correlation.

Once the offenses are generated by SIEM, they are passed through the advanced threat disposition system (ATDS) for confirmation and auto disposition (escalation versus closure). That is, ATDS is a machine learning predictive platform that labels the SIEM offenses (escalation vs. closure) based on historical threat analysis done by security experts.

Low priority logs (labeled normal by the anomaly detection system) are not forwarded to the SIEM. Rather, they are analyzed by a low-cost analytics system using supervised machine learning techniques. Offenses generated from the low-cost analytics system, as well as those output from the ATDS system, are forwarded to the ticketing system for adjusting the device/system that is experiencing an anomaly described by the anomalous data set.

One or more embodiments of the present invention comprise and/or utilize an analytics environment, data, data parsing and cleaning logic, feature analysis and visualization logic, feature engineering, feature encoding logic, feature normalization logic, hyperparameter tuning logic, machine learning, anomaly scoring logic, and analyst validation.

That is, an analytics environment includes a support structure, such as a platform for object oriented languages and machine learning libraries used by such languages.

Data is log data that describes attributes of particular systems, including connection log data. An exemplary connection log data is made up of over one million logs, each of which have multiple (e.g., 20 or more) features (i.e., attributes of the system that is being monitored). Another exemplary log data is data from anomaly detection systems that identify anomalies for all types of log sources, such as access logs (i.e., a record of entities that have and/or are accessing certain resources); dynamic host configuration protocol (DHCP) logs that describe attributes associated with a DHCP server when dynamically assigning internet protocol (IP) addresses to network devices; domain name system (DNS) logs that describe features of a DNS server while translating domain names to IP addresses; firewall logs that describe operations of a firewall when protecting resources, etc. In an embodiment of the present invention, such anomaly detections systems run in parallel.

Data parsing and cleaning logic is logic that parses and rearranges parameters of data in order to present the log data in a manner that is more useful to understanding and recognizing anomalous/outlier data.

Feature analysis and visualization logic is logic that enables the visualization of features, such as on a heat map, histogram, etc.

Feature engineering logic adds new features to a log in order to supplement existing feature sets found in earlier versions of that log.

Feature encoding logic creates and utilizes codes (e.g., letters, numeric values, etc.) that represent certain internet protocol (IP) addresses of a monitored system, port types used by that system, communication protocols used by that system, the connection status of that system to a network or monitoring system, etc.

Feature normalization logic is logic that sets data that uses different scales for different parameters into a same scale, in order to better recognize anomalous data.

Hyperparameter tuning logic is logic that sets weight values of parameters of a sensor set before the sensor set is evaluated for anomalies.

Machine learning is artificial intelligence, such as a deep neural network, etc.

Anomaly scoring logic scores how "certain" the system is that a particular anomaly is in fact anomalous (i.e., shows a feature of the monitored system that is not found in normal/error-free operations).

Analyst validation is performed by artificial intelligence, or a human operator, to validate certain data as being anomalous.

With reference now to FIG. 2, an original data set 202 shows five data logs (i.e., records of features) of multiple systems. That is, Log0 is for 15 parameters from a first set of systems, Log1 is for these same 15 parameters but for a second set of systems, etc.

Figure 3:
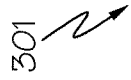
FIG. 3 depicts data from the event log shown in FIG. 2 after being cleaned, engineered, encoded, and normalized in one or more embodiments of the present invention.

As shown in FIG. 3, dataset 301 shows the data from original data set 202 after it has been transformed (in order to show both the 15 parameters from the original data set 202 in FIG. 2 as well as 10 new parameters that are created by evaluating the original data set 202).

A series of data transformation, cleaning and normalization steps are performed on the dataset. The resulting dataset is engineered for 25 features for learning, including 10 new features that are selected by the user and/or the system. All 25 features are encoded and normalized for use by the anomaly detection logic (e.g., anomaly detection system 608 and/or anomaly prioritization system 624 shown in FIG. 6), as described herein.

Figure 4:
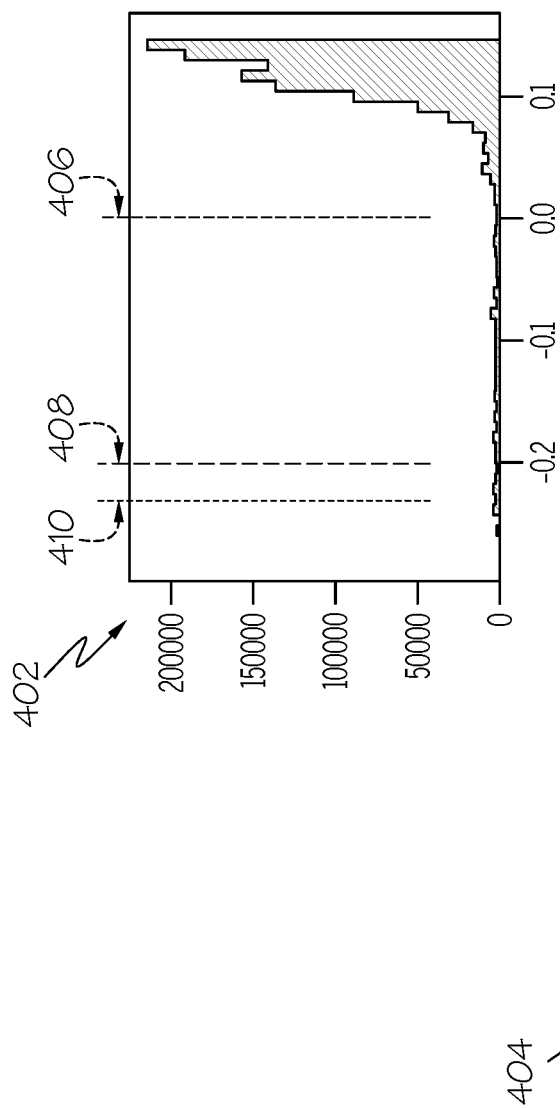
FIG. 4 illustrates an exemplary unsupervised machine learning algorithm for recognizing anomalies in an event log in one or more embodiments of the present invention.

As shown in FIG. 4, data from the dataset 404 is fed into an unsupervised machine learning logic, such as an isolation forest algorithm, resulting in the histogram 402. That is, the Y-axis of histogram 402 shows a total number of log entries for each anomaly score shown on the X-axis. The system has scaled the anomaly scores such that any score over 0.0 (i.e., a positive score) is deemed to be normal, as indicated by marker line 406. However, any anomaly score that is negative is deemed to be potentially anomalous. That is, any log entry with an anomaly score between 0.0 and −0.20 (see marker line 408) is deemed to have a low likelihood of actually being anomalous, with this likelihood increasing as the anomalous score approaches marker line 408. Any log entry with an anomaly score between −0.20 (marker line 408) and −0.25 is deemed to have an increased likelihood of actually being anomalous, with this likelihood increasing as the anomalous score approaches marker line 410. Any log entry that is to the left of marker line 410 (i.e., having an anomalous score of less than −0.25) is deemed to have a high likelihood of actually being anomalous.

Figure 5:
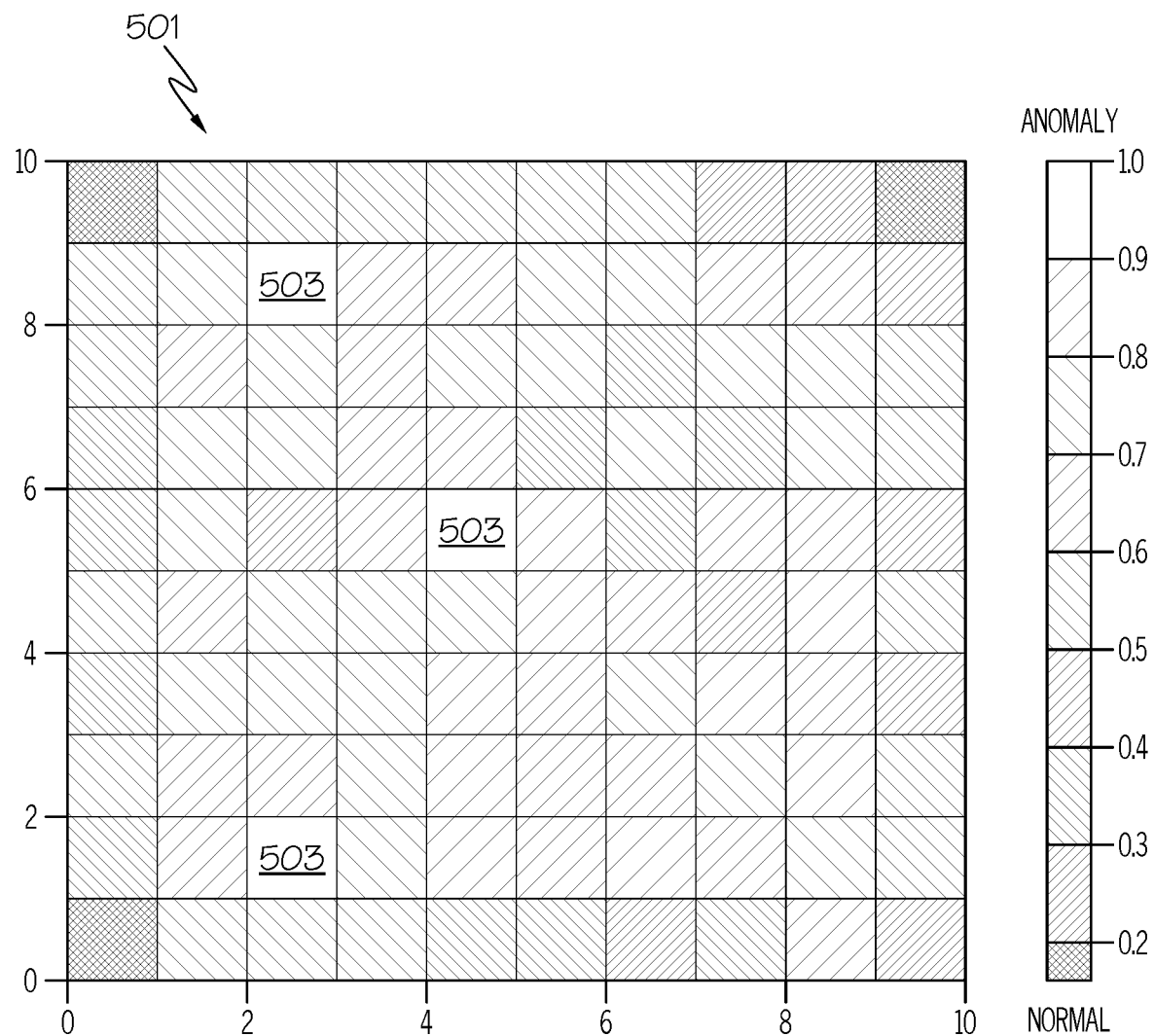
FIG. 5 depicts an exemplary unsupervised deep learning for ranking event anomaly sets in one or more embodiments of the present invention.

With reference now to FIG. 5, a graph 501 generated using a self organizing maps (SOM) algorithm shows sets of log data that are deemed to be anomalous. That is, graph 501 is a 10×10 graph of 100 sets of log data. Those that are colored darkest have an anomaly score of 0.0 (or higher), and thus are deemed to be normal. However, as the potential for data in a set of log data being anomalous increases, the shading for sets of log data lightens, until a white shading indicates a high likelihood that the data in that set of log data is in fact anomalous, as indicated by label 503.

Figure 6:
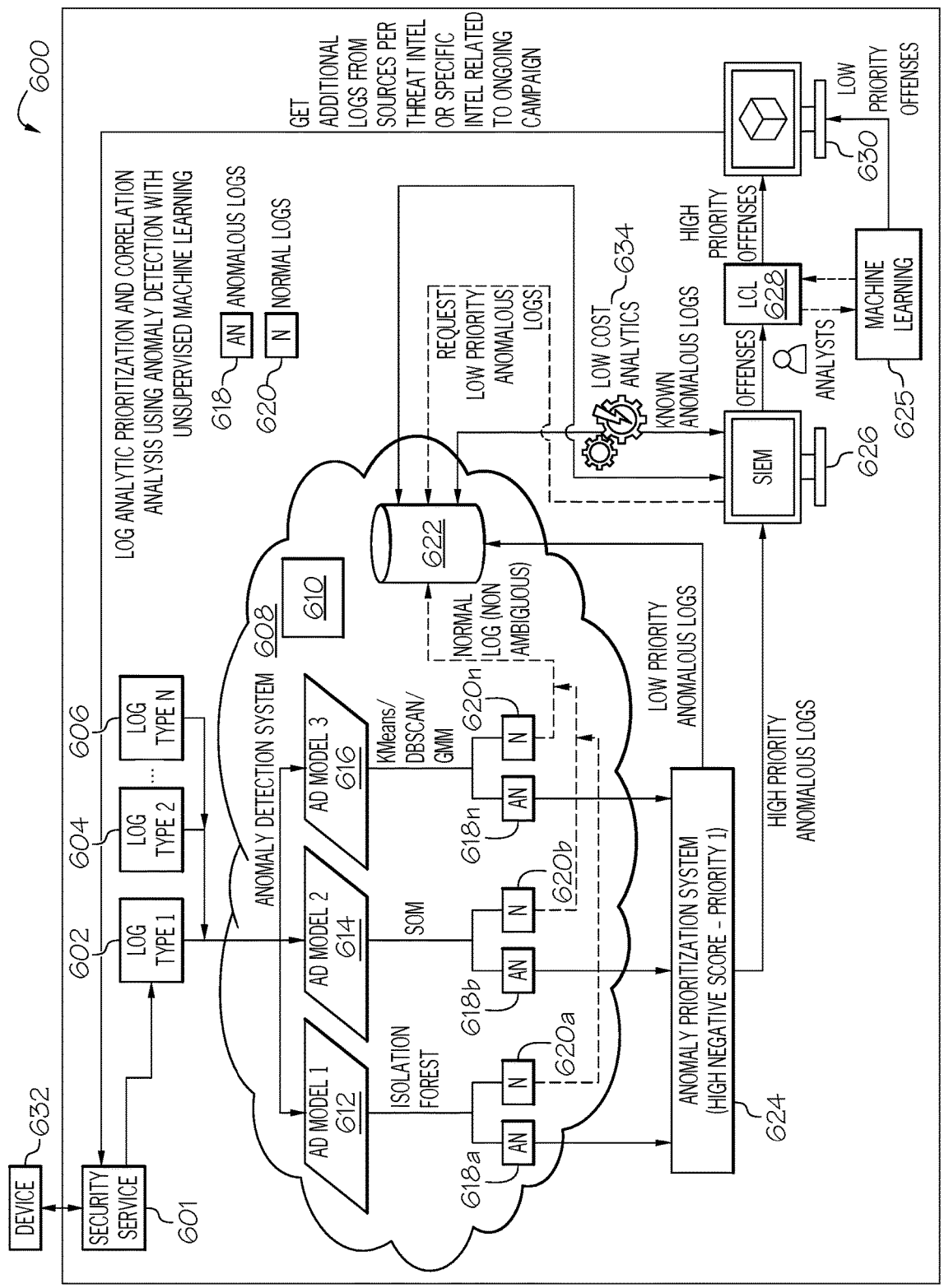
FIG. 6 illustrates an overview of an exemplary embodiment of one or more embodiments of the present invention.

With reference now to FIG. 6, details of an anomaly prioritization system 600 that assigns a relative priority (P1-P3) for security information and event management (SIEM)/database (DB) forwarding depending on the anomalous confidence levels is presented.

In one embodiment, the anomaly prioritization system 600 receives multiple logs from systems (e.g., computers, networks, production machinery, transportation systems, etc.). As such, a security service 601 (e.g., a firewall, a proxy server, a checkpoint in a program, etc.) sends log data that describes operations of certain systems. For example, log type 1 (block 602) could be for applications), log type 2 (block 604) could be for hardware devices such as servers, storage devices, etc., and log type n (block 606) could be for a domain name server. Thus, even though there are disparate types of logs for disparate types of monitored systems, the present invention is able to detect anomalies in all of the logs concurrently, since it is irrelevant what the data represents. Rather, the anomaly prioritization system 600 recognizes data that is anomalous regardless of what it represents, as determined by an anomaly detection system 608 that resides in an ecosystem, such as a cluster ecosystem platform of servers 610 that supports the anomaly detection system 608.

As shown in FIG. 6, these disparate types of logs (shown in the exemplary blocks 602-606) are fed into an anomaly detection system 608, which resides on (i.e., is architecturally running on) a platform of servers (i.e., a cluster ecosystem of computing devices). In an embodiment of the present invention, this anomaly detection system 608 is made up of disparate types of anomaly detection systems/models, depicted as anomaly detection model 1 (612, e.g., the isolation forest model described above), anomaly detection model 2 (614, e.g., self organizing maps (SOM) algorithm described above), and anomaly detection model 3 (616, e.g., a clustering algorithm as described above).

As depicted in FIG. 6, each of the anomaly detection models 1-3 (elements 612-616) determine that the data received from log types 1-n (elements 602-606) include anomalous logs (AN), as indicated by the blocks 618 with "AN" depicted within them, and normal logs (N), as indicated by the blocks 620 with an "N" depicted within them, according to definitions of "anomalous" and "normal" as defined and determined by their respective algorithms. That is, blocks 618a-618n represent anomalous logs (versions of anomalous log 618) that are respectively identified by anomaly detection model 1, anomaly detection mode 2, and anomaly detection model 3, while blocks 620a-620n represent normal logs that are respectively identified by anomaly detection model 1, anomaly detection mode 2, and anomaly detection model 3.

The normal (non-anomalous) logs (shown in blocks 620a-620n) are sent to a database 622. These normal logs often represent 90% or more of the logs being evaluated. (See the graph of normal logs depicted to the right of marker line 406 in the histogram 402 shown in FIG. 4.) From the database 622, these normal logs are then sent to low-cost analytics 634, in order to confirm that they are in fact normal. That is, the low-cost analytics 634 is an analytic system that confirms that the data logs are normal for a particular environment (e.g., the application environment of the log type 1, the network environment of the log type 2, the domain name server environment of log type n, etc.). This simple analytics system can be performed using a cheap (in terms of financial cost, manpower cost, resources cost, etc.) process such as comparing the normal log data to known data ranges for these different environments, etc.

The anomalous logs (shown in blocks 618a-618n) are sent to an anomaly prioritization system 624. This anomaly prioritization system 624 utilizes metrics that determine how likely it is that the anomalous logs actually contain anomalous data. (See, for example, the histogram 402 shown and described in FIG. 4.)

This results in logs that are low priority logs being sent to the database 622 for further evaluation as described above. That is, logs between marker line 410 and marker line 406 shown in FIG. 4 might be anomalous, but have a low likelihood of being so. As such, they are further evaluated by the low-cost analytics 634 for a quick check to confirm whether they are in fact anomalous or normal by comparing them to known logs.

As shown in FIG. 6, a security information and management system (SIEM) 626 receives high priority anomalous logs from the anomaly detection system 606. SIEM 626 is a combination of security information management (i.e., collection, storage, and management of security data) and security event management (i.e., interpreting and responding to security events).

However, SIEM 626 requires high levels of resources, computing power, storage, and/or human analysts, thus making it very expensive in terms of time, money, and resource usage. That is, SIEM 626 obtains additional logs from other sources in order to identify actual anomalous conditions (e.g., threats, attacks, etc.), in order to fully evaluate the new anomalous logs.

Thus, in order to improve the functionality of the SIEM 626, the present invention sends only log event data that has been determined to be highly likely to contain anomalous event data (e.g., data that indicates a problem with a resource, an attack on a resource, etc.) to the SIEM 626. That is, in a preferred embodiment of the present invention, only high priority anomalous logs are sent to the SIEM 626, thus improving the functionality of the anomaly prioritizing system 600, and including the SIEM 626 by limiting traffic (and thus saving bandwidth) between the anomaly detection system 608 and the SIEM 626, and using the SIEM 626 only on anomalous logs that are highly likely to contain anomalous log data.

In an alternative embodiment, the SIEM 626 also handles low priority log data, and even normal log data, during periods of time when the SIEM 626 is not being used above some predetermined demand level (e.g., on weekends). That is, if the SIEM 626 is determined to be idle, or being used well below its capacity by the anomaly prioritization system 624, then the SIEM 626 is used to examine low priority anomalous logs received from the database 622.

In an embodiment of the present invention, and as shown in FIG. 6, known anomalous logs (i.e., very high priority anomalous logs) identified by the low-cost analytics 634 are also sent to the SIEM 626.

Once the SIEM 626 has evaluated the high-priority (and/or known) anomalous logs, it sends the evaluated anomalous logs to a log confirmation logic (LCL) 628, which utilizes machine learning 625 (analogous to artificial intelligence 125 shown in FIG. 1) to confirm that the high-priority anomalous logs actually contain anomalous log data. The LCL 628 and/or the machine learning 625 then send a ticket to a ticketing system 630 directing a system to handle the anomaly that caused the anomalous log data.

Figure 7:
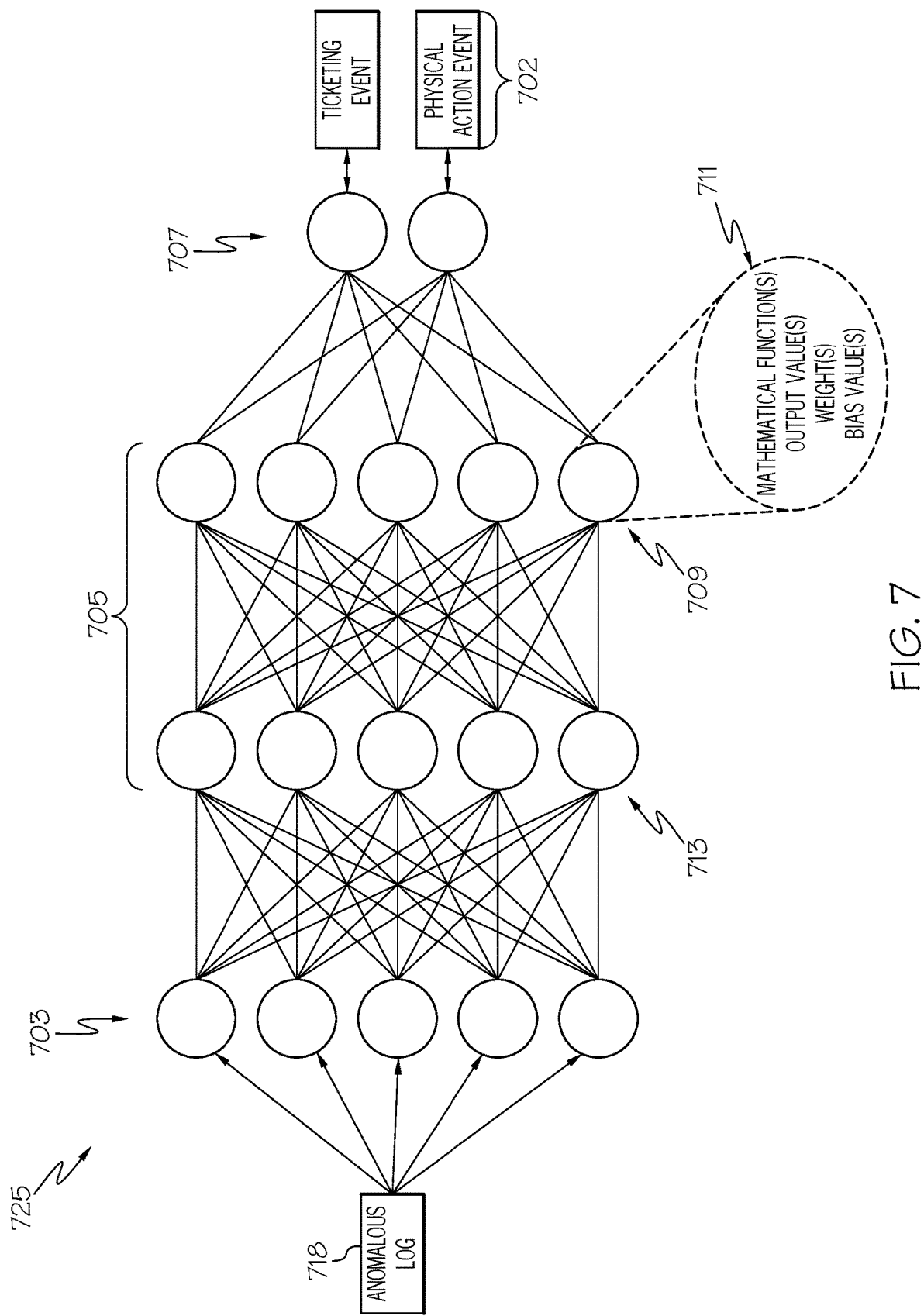
FIG. 7 depicts an exemplary neural network as used in one or more embodiments of the present invention.

For example, consider FIG. 7, which depicts a deep neural network 725 (analogous to machine learning 625 shown in FIG. 6).

That is, in one or more embodiments, the present invention uses an electronic neural network, which is an example of the artificial intelligence 125 shown in FIG. 1, to issue a ticket that addresses an anomaly in the system, determine if a physical action is to be performed, etc. In various embodiments of the present invention, the artificial intelligence 125 shown in FIG. 1 is a deep neural network (DNN), a convolutional neural network (CNN), and/or another type of machine learning system. In a preferred embodiment, a deep neural network is used to identify and/or utilize anomalous logs.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons often are never technically "inhibitory", but are only "excitatory" to varying degrees. In other electronic neural networks, however, electronic neurons are capable of inhibitory signals, which reduce the ability of a follow-on neuron to produce a positive output.

In an electronic neural network, neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often a single node for holding vector information.

With reference now to FIG. 7, a deep neural network (DNN) 725 (analogous to machine learning 625 shown in FIG. 6) used to evaluate logs in one or more embodiments of the present invention is presented. For example, assume, for illustrative purposes, that anomalous log 718 is the anomalous log shown in block 618*a* in FIG. 6. As such, anomalous log 718 is entered into the input layer 703 of the deep neural network 725.

As shown in FIG. 7, the electronic neurons in DNN 725 are arranged in layers, known as the input layer 703, hidden layers 705, and an output layer 707. The input layer 703 includes neurons/nodes that take input data, and send it to a series of hidden layers of neurons (e.g., hidden layers 705), in which neurons from one layer in the hidden layers are interconnected with all neurons in a next layer in the hidden layers 705. The final layer in the hidden layers 705 then outputs a computational result to the output layer 707, which is often a single node for holding vector information. In an embodiment of the present invention, each neuron in the output layer 707 is associated with a particular event label from event labels 702, as shown in FIG. 7.

As just mentioned, each node in the depicted DNN 724 represents an electronic neuron, such as the depicted neuron 709. As shown in block 711, each neuron (including neuron 709) includes at least four features: a mathematical function, an output value, a weight, and a bias value.

The mathematical function is a mathematic formula for processing data from one or more upstream neurons. For example, assume that one or more of the neurons depicted in the middle hidden layers 705 send data values to neuron 709. Neuron 709 then processes these data values by executing the mathematical function shown in block 711, in order to create one or more output values, which are then sent to another neuron, such as another neuron within the hidden layers 705 or a neuron in the output layer 707. Each neuron also has a weight that is specific for that neuron and/or for other connected neurons. Furthermore, the output value(s) are added to bias value(s), which increase or decrease the output value, allowing the DNN 724 to be further "fine tuned".

For example, assume that neuron 713 is sending the results of its analysis of a piece of data to neuron 709. Neuron 709 has a first weight that defines how important data coming specifically from neuron 713 is. If the data is important, then data coming from neuron 713 is weighted heavily, and/or increased by the bias value, thus causing the mathematical function (s) within neuron 709 to generate a higher output, which will have a heavier impact on neurons in the output layer 707. Similarly, if neuron 713 has been determined to be significant to the operations of neuron 709, then the weight in neuron 713 will be increased, such that neuron 709 receives a higher value for the output of the mathematical function in the neuron 713. Alternatively, the output of neuron 709 can be minimized by decreasing the weight and/or bias used to affect the output of neuron 709. These weights/biases are adjustable for one, some, or all of the neurons in the DNN 725, such that a reliable output will result from output layer 707. Such adjustments are alternatively performed manually or automatically.

When manually adjusted, the weights and/or biases are adjusted by the user in a repeated manner until the output from output layer 707 matches expectations. For example, assume that DNN 725 is being trained to recognize anomalies in the anomalous log 718 (e.g., by recognizing certain patterns in the data in input logs). As such, when input layer 703 receives the inputs of anomalous log 718, then DNN 725 (if properly trained by manually adjusting the mathematical function(s), output value(s), weight(s), and biases in one or more of the electronic neurons within DNN 725) outputs a correct output vector to the output layer 707. More specifically, it provides an event label from event labels 702 that is a ticketing event (i.e., instructions to the ticketing system 630 shown in FIG. 6 to generate an action ticket warning of the anomaly in the log and/or instructions to adjust the application, network, domain name server, etc. being logged). In an embodiment of the present invention, the event label from the event labels is a physical action event, which directly controls the physical device 154 shown in FIG. 1, such as the network and/or domain name server described in FIG. 6.

The physical action event is an event at a physical device. In the example just described above for a network (see block 604 in FIG. 6 and physical device 154 shown in FIG. 1), the deep neural network 725 may determine that the network is being attacked, based on the anomalous log 718 for that network. As such, the DNN 725 (analogous to machine learning 625 in FIG. 6 and artificial intelligence 125 shown in FIG. 1) will directly adjust, control, and/or modify the network to stop the attack.

When automatically adjusted, the weights (and/or mathematical functions) are adjusted using "back propagation", in which weight values of the neurons are adjusted by using a "gradient descent" method that determines which direction each weight value should be adjusted to.

A CNN is similar to a DNN in that both utilize interconnected electronic neurons. However, a CNN is different from a DNN in that 1) a CNN has neural layers whose sizes are based on filter sizes, stride values, padding values, etc., and 2) a CNN utilizes a convolution scheme to analyze image data. A CNN gets its "convolutional" name based on a convolution (i.e., a mathematical operation on two functions to obtain a result) of filtering and pooling pixel data (a mathematical operation on two functions) in order to generate a predicted output (obtain a result). A CNN is used if the logs represent photographic anomalies, in accordance with one or more embodiments of the present invention.

Four exemplary use cases are now presented to describe one or more embodiments of the present invention.

New Known Normal Traffic

Assume that a managed security service provider (MSSP) has monitored many customers with traffic to a popular internet based service and determined that the traffic is normal. That is, the log traffic has been compared to known normal log traffic for that internet based server, and/or to a majority of other log traffic for that internet based service, and/or to a traffic for a particular user that has declared that this type/pattern of traffic is normal.

A customer of the MSSP with a large user base adopts the use of this internet based service, thus causing the generation of a large number of security related logs. The anomaly detection models 1-3 described herein (i.e., elements 612-616 shown within the anomaly detection system 608 in FIG. 6) have already been trained that this type of traffic is normal, and therefore routes the logs related to the new service use to disk based storage to be processed by low cost analytics and correlation. In this embodiment, the artificial intelligence is "supervised", since it has been trained to recognize certain log patterns of data, but the overall system is deemed to be "unsupervised", since the anomaly detection models 1-3 use unsupervised logic. As such, since this use case uses unsupervised anomaly detection models 1-3, the overall system is unsupervised.

New Known Bad Traffic

Assume now that a device belonging to a customer of the MSSP begins reporting traffic between the customer's network and a new endpoint. The anomaly detection models 1-3, having already been trained that this type of traffic is "anomalous", route the logs related to the traffic through the anomaly prioritization system 624 in FIG. 6. Based on an indication of compromised data in the new traffic, the system increases the priority of the event causing the priority of any generated alerts to also be elevated. That is, based on past operations by the SIEM 626 on other similar/known bad traffic, the anomaly prioritization system 624 sets metadata around the event that caused the bad traffic to trigger an immediate alert based on predefined rules within the SIEM 626.

Similar to the use case for new known traffic, the log traffic has been compared to known bad log traffic for that internet based server, and/or to a majority of other log traffic for that internet based service, and/or to a traffic for a particular user that has declared that this type/pattern of traffic is abnormal. Thus, in this example the definition of anomalous log traffic was determined by a greater set of logs observed by the MSSP.

Again, since this use case uses unsupervised anomaly detection models 1-3, the overall system is unsupervised.

New Unknown Traffic

Assume now that a device belonging to a customer of the MSSP begins reporting anomalous traffic between the customer's network and a new endpoint, as determined by comparing the traffic to other log traffic observed by the MSSP. The anomaly detection models 1-3 shown in FIG. 6 are able designed to determine that this type of traffic is "anomalous", and thus routes the logs related to the traffic through the anomaly prioritization system 624. However, the anomaly detection models 1-3 are not able to conclusively determine that the traffic is "bad" or "good". As such, the anomaly prioritization system 624 does not adjust the event's metadata or priority, but still routes the traffic to the SIEM 626. If after a period of time passes with no confirmed alerts and/or other criteria that would designate the traffic as "bad" the system records that the traffic is less risky (e.g., normal). At this point the anomaly prioritization system starts routing the events over to the database 622, in order to be processed by low cost analytics 634 instead of sending the logs through the SIEM 626. Over time, feedback from the low-cost analytics 634 is recorded into the database 622, thus allowing the anomaly detection models 1-3 to be updated to designate the traffic as normal allowing it to bypass the anomaly prioritization system 624 entirely.

Again, since this use case uses unsupervised anomaly detection models 1-3, the overall system is unsupervised.

New Known Good Log Data that Goes Bad

Assume now that log traffic that was previously determined to be "good" or traffic that the anomaly detection models have determined to be normal has been stored in the database 622 and run through the low-cost analytics 634. However, the low-cost analytics 634 begins to mark the traffic as "bad", thus generating alerts in the SIEM 626, which have been confirmed by machine based and/or human analysts. The system updates anomaly detection models 1-3 to flag the anomalous traffic as "bad", thus allowing the anomaly prioritization system 624 to increase the event's priority and/or adjust metadata associated with the event, thereby allowing the SIEM 626 to better process the alert. Again, since this use case uses unsupervised anomaly detection models 1-3, the overall system is unsupervised.

Figure 8:
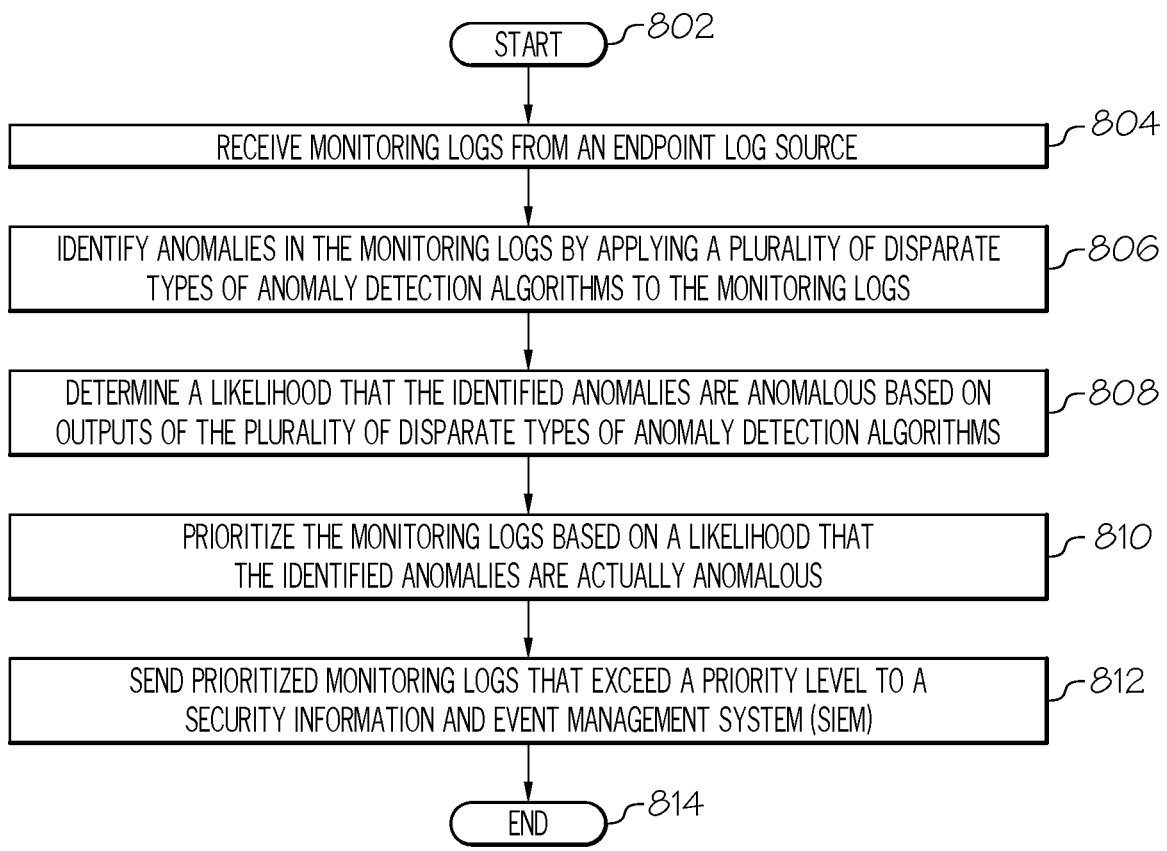
FIG. 8 is a high-level flow chart of one or more steps performed in accordance with one or more embodiments of the present invention.

With reference now to FIG. 8, a high-level flow chart of one or more embodiments of the present invention is presented.

After initiator block 802, one or more processors (e.g., processor 104 in computer 102) receive monitoring logs (e.g., original data set 202 shown in FIG. 2) from an endpoint log source (e.g., sensors that are monitoring an application, network, domain name server, etc.), as described in block 804.

As described in block 806, the processor(s) identify anomalies in the monitoring logs by applying a plurality of disparate types of anomaly detection algorithms to the monitoring logs. In an embodiment of the present invention, these anomaly detection algorithms are applied concurrently to the monitoring logs. In another embodiment of the present invention, these anomaly detection algorithms are applied sequentially to the monitoring logs.

As described in block 808, the processor(s) determine a likelihood that the identified anomalies are anomalous based on outputs of the plurality of disparate types of anomaly detection algorithms. That is, the disparate types of anomaly detection algorithms (e.g., anomaly detection models 1-3 shown in FIG. 6), using the logic described herein, determine the likelihood that particular sets of logs are anomalous.

As described in block 810, the processor(s) prioritize the monitoring logs based on the likelihood that the identified anomalies are actually anomalous. That is, the anomaly prioritization system 624 shown in FIG. 6 collectively uses these determinations to establish which logs are high priority (highly likely to contain anomalous logs) and which are low priority (less likely to contain anomalous logs).

As described in block 812, the processor(s) send (e.g., via the anomaly priority system 624) prioritized monitoring logs that exceed a priority level to a security information and event management system (SIEM), such as SIEM 626 shown in FIG. 6, from which ticketing and other events are established.

The flow chart ends at terminator block 814.

In an embodiment of the present invention, and as described in anomaly detection models 1-3 shown in FIG. 6, unsupervised machine learning is used to identify the anomalies.

In an embodiment of the present invention, the anomaly detection system 608 shown in FIG. 6 sends prioritized monitoring logs that are below the priority level (i.e., low priority anomalous logs) to an analytics system that uses fewer resources (e.g., low cost analytics 634 shown in FIG. 6) than the SIEM 626.

In an embodiment of the present invention, and as described in FIG. 6, the plurality of disparate types of anomaly detection algorithms comprise an Isolation Forest algorithm, a clustering algorithm, and a Self-Organizing Map (SOM) algorithm.

In an embodiment of the present invention, endpoint log source is a sensor in an endpoint device, such as network hardware. In this embodiment, the processor(s) create a corrective action to correct the anomalies in the prioritized monitoring logs for the endpoint device, and send instructions to a managed security service provider to execute the corrective action. For example, assume that the ticketing system 630 shown in FIG. 6 does not only generate action tickets, but also executes those tickets. As such, the ticketing system 630 sends instructions to a physical device 632 (e.g., a router in a network), either directly or via the security service 601 as shown in FIG. 6, that adjusts the physical device 632 in a manner that is known to ameliorate the anomaly that caused the anomalous log. For example, if the anomalous log showed that the network router was being attacked on a particular port, then that particular port is automatically shut down, in order to prevent the attack from continuing.

In an embodiment of the present invention, assume that the endpoint log source is a sensor in an endpoint device (e.g., a router in a network). In this embodiment, an artificial intelligence system is trained to direct a controller to adjust operations of the endpoint device based on the prioritized monitoring logs that exceed the priority level. That is, assume that the machine learning 625 shown in FIG. 6 has an architecture that is similar to the DNN 725 shown in FIG. 7. Assume further that the security service 601 shown in FIG. 6 includes hardware and/or software that acts as a controller of the router (device 632), which is being attacked. As such, the controller will close a port on the router, redirect the incoming attack packets to an isolation unit or a honey pot (i.e., logic that collects and isolates the incoming attack packets in order to determine the source of the attack), etc.

In an embodiment of the present invention in which the endpoint log source is a sensor in an endpoint device (e.g., a computer system in a network), the method further includes training an artificial intelligence system to direct a controller to change a functionality of the endpoint device based on the prioritized monitoring logs that exceed the priority level. That is, assume that the log type 1 shown in FIG. 6 sees that a particular computer on a network is being attacked. In this exemplary scenario, the security service 601 will not only isolate the computer system (device 632) from the rest of the network, but will automatically reconfigure it to appear to be sending malicious packets to other devices on the network. However, the computer system is not actually sending malicious packets to the other devices on the network, but is reporting back to the attack source that it is doing so, providing the attack source with fake IP addresses and/or MAC addresses of the computer that are being "attacked" now by the device 632, etc.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
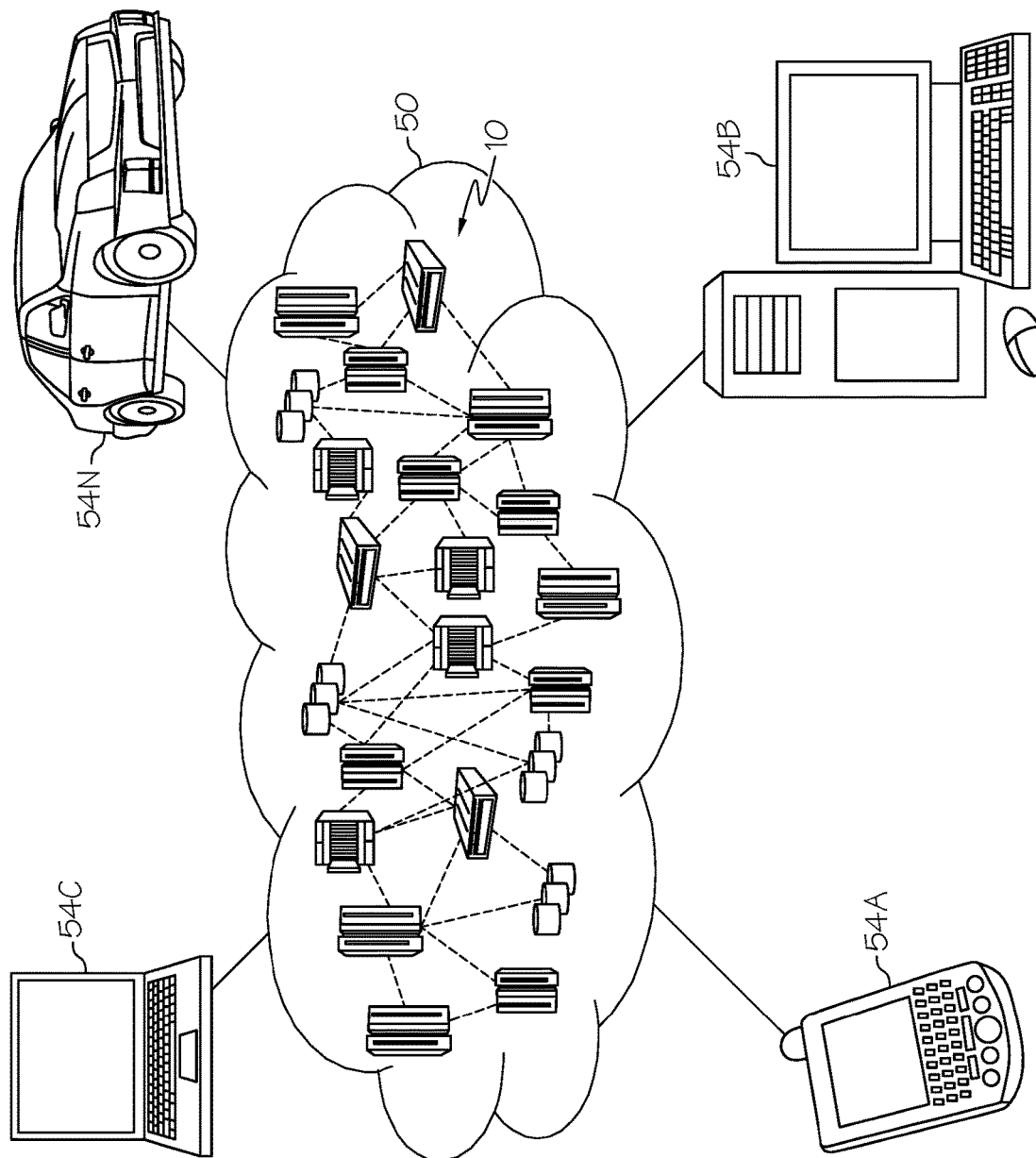
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 9 are intended to be illustrative only and that computing nodes 10 and cloud computing environment 50 can communicate with any type of computerized device over any type of network and/or network addressable connection (e.g., using a web browser).

Figure 10:
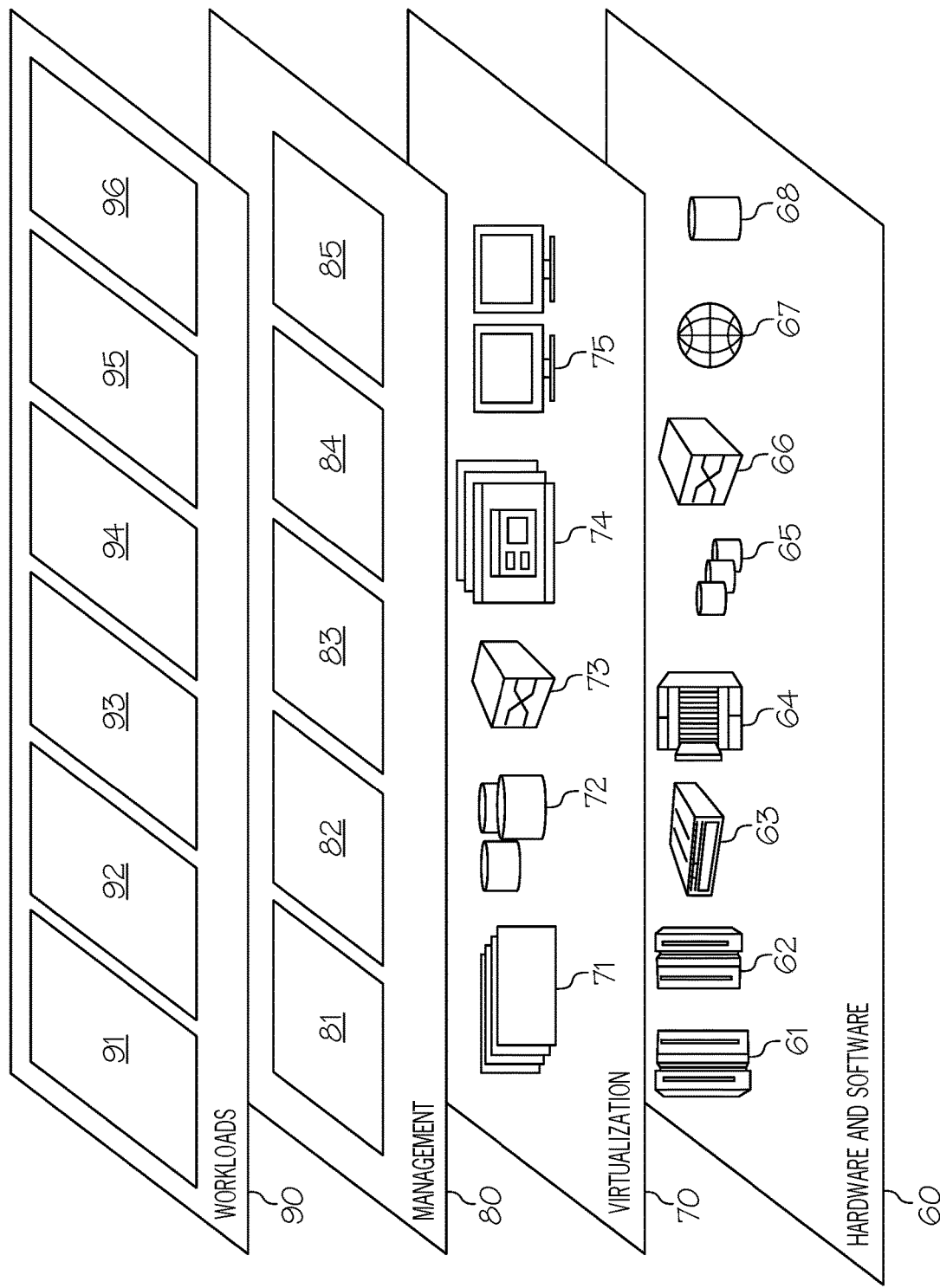
FIG. 10 depicts abstraction model layers of a cloud computer environment according to an embodiment of the present invention.

Referring now to FIG. 9, a set of functional abstraction layers provided by cloud computing environment 50 (FIG. 10) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71;

virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and anomalous log processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method, in a data processing system comprising at least one processor and at least one memory, the at least one memory comprising instructions that are executed on the at least one processor to specifically configure the at least one processor to perform the method comprising:
receiving monitoring logs from an endpoint log source;
identifying anomalies in the monitoring logs by executing a plurality of disparate types of unsupervised machine learning (ML) trained anomaly detection artificial intelligence (AI) computer models on the monitoring logs, each unsupervised ML trained anomaly detection AI computer model automatically generating an output, for each monitoring log, indicating a measure of a likelihood that the monitoring log is anomalous;
determining a likelihood that the identified anomalies are actually anomalous based on a combination of the outputs from the plurality of disparate types of unsupervised ML trained anomaly detection AI computer models;
prioritizing the monitoring logs based on the determined likelihood that the identified anomalies are actually anomalous as determined by the combination of the outputs of the plurality of disparate types of unsupervised ML trained anomaly detection AI computer models; and
sending prioritized monitoring logs that exceed a priority level to a security information and event management (SIEM) computing system.

2. The method of claim 1,
wherein the plurality of disparate types of unsupervised ML trained anomaly detection AI computer models comprise at least one unsupervised ML trained neural network having a plurality of layers of electronic neurons.

3. The method of claim 1, further comprising:
sending prioritized monitoring logs that are below the priority level to an analytics system that uses fewer resources than the SIEM.

4. The method of claim 1, wherein the plurality of disparate types of unsupervised ML trained anomaly detection AI computer models comprise an Isolation Forest computer model, a clustering computer model, and a Self-Organizing Map (SOM) computer model, and wherein each of the Isolation Forest computer model, clustering computer model, and SOM computer model generate separate outputs for each monitoring log in the monitoring logs, indicating a measure of likelihood that the monitoring log is anomalous.

5. The method of claim 1, wherein the endpoint log source is a sensor in an endpoint device, and wherein the method further comprises:
creating a corrective action to correct the identified anomalies in the prioritized monitoring logs for the endpoint device; and
sending instructions to a managed security service provider to execute the corrective action.

6. The method of claim 1, wherein the endpoint log source is a sensor in an endpoint device, and wherein the method further comprises:

training an artificial intelligence system to direct a controller to adjust operations of the endpoint device based on the prioritized monitoring logs that exceed the priority level.

7. The method of claim 1, wherein the endpoint log source is a sensor in an endpoint device, and wherein the method further comprises:

training an artificial intelligence system to direct a controller to change a functionality of the endpoint device based on the prioritized monitoring logs that exceed the priority level.

8. A computer program product comprising a computer readable storage medium having program code embodied therewith, wherein the computer readable storage medium is not a transitory signal per se, and wherein the program code is readable and executable by a processor to perform a method comprising:

receiving monitoring logs from an endpoint log source;

identifying anomalies in the monitoring logs by executing a plurality of disparate types of unsupervised machine learning (ML) trained anomaly detection artificial intelligence (AI) computer models on the monitoring logs, each unsupervised ML trained anomaly detection AI computer model automatically generating an output, for each monitoring log, indicating a measure of a likelihood that the monitoring log is anomalous;

determining a likelihood that the identified anomalies are actually anomalous based on a combination of the outputs from the plurality of disparate types of unsupervised ML trained anomaly detection AI computer models;

prioritizing the monitoring logs based on the determined likelihood that the identified anomalies are actually anomalous as determined by the combination of the outputs of the plurality of disparate types of unsupervised ML trained anomaly detection AI computer models; and sending prioritized monitoring logs that exceed a priority level to a security information and event management (SIEM) computing system.

9. The computer program product of claim 8, wherein the method further comprises:

sending prioritized monitoring logs that are below the priority level to an analytics system that uses fewer resources than the SIEM.

10. The computer program product of claim 8, wherein the plurality of disparate types of unsupervised ML trained anomaly detection AI computer models comprise an Isolation Forest computer model, a clustering computer model, and a Self-Organizing Map (SOM) computer model, and wherein each of the Isolation Forest computer model, clustering computer model, and SOM computer model generate separate outputs for each monitoring log in the monitoring logs, indicating a measure of likelihood that the monitoring log is anomalous.

11. The computer program product of claim 8, wherein the endpoint log source is a sensor in an endpoint device, and wherein the method further comprises:

creating a corrective action to correct the identified anomalies in the prioritized monitoring logs for the endpoint device; and sending instructions to a managed security service provider to execute the corrective action.

12. The computer program product of claim 8, wherein the endpoint log source is a sensor in an endpoint device, and wherein the method further comprises:

training an artificial intelligence system to direct a controller to adjust operations of the endpoint device based on the prioritized monitoring logs that exceed the priority level.

13. The computer program product of claim 8, wherein the program code is provided as a service in a cloud environment.

14. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

receiving monitoring logs from an endpoint log source;

identifying anomalies in the monitoring logs by executing a plurality of disparate types of unsupervised machine learning (ML) trained anomaly detection artificial intelligence (AI) computer models on the monitoring logs, each unsupervised ML trained anomaly detection AI computer model automatically generating an output, for each monitoring log, indicating a measure of a likelihood that the monitoring log is anomalous;

determining a likelihood that the identified anomalies are actually anomalous based on a combination of the outputs from the plurality of disparate types of unsupervised ML trained anomaly detection AI computer models;

prioritizing the monitoring logs based on the determined likelihood that the identified anomalies are actually anomalous as determined by the combination of the outputs of the plurality of disparate types of unsupervised ML trained anomaly detection AI computer models; and sending prioritized monitoring logs that exceed a priority level to a security information and event management (SIEM) computing system.

15. The computer system of claim 14, wherein the method further comprises:

sending prioritized monitoring logs that are below the priority level to an analytics system that uses fewer resources than the SIEM.

16. The computer system of claim 14, wherein the plurality of disparate types of unsupervised ML trained anomaly detection AI computer models comprise an Isolation Forest computer model, a clustering computer model, and a Self-Organizing Map (SOM) computer model, and wherein each of the Isolation Forest computer model, clustering computer model, and SOM computer model generate separate outputs for each monitoring log in the monitoring logs, indicating a measure of likelihood that the monitoring log is anomalous.

17. The computer system of claim 14, wherein the endpoint log source is a sensor in an endpoint device, and wherein the method further comprises:

creating a corrective action to correct the identified anomalies in the prioritized monitoring logs for the endpoint device; and sending instructions to a managed security service provider to execute the corrective action.

18. The computer system of claim 14, wherein the endpoint log source is a sensor in an endpoint device, and wherein the method further comprises:
   training an artificial intelligence system to direct a controller to adjust operations of the endpoint device based on the prioritized monitoring logs that exceed the priority level.

19. The computer system of claim 14, wherein the endpoint log source is a sensor in an endpoint device, and wherein the method further comprises:
   training an artificial intelligence system to direct a controller to change a functionality of the endpoint device based on the prioritized monitoring logs that exceed the priority level.

20. The computer system of claim 14, wherein the stored program instructions are provided as a service in a cloud environment.

* * * * *